Figure 4:
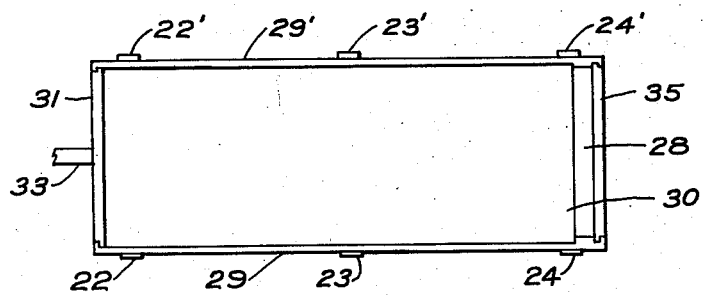

Oct. 13, 1959  W. S. CALCOTT  2,908,548
MANUFACTURE OF UF$_4$
Filed April 13, 1945  2 Sheets-Sheet 1
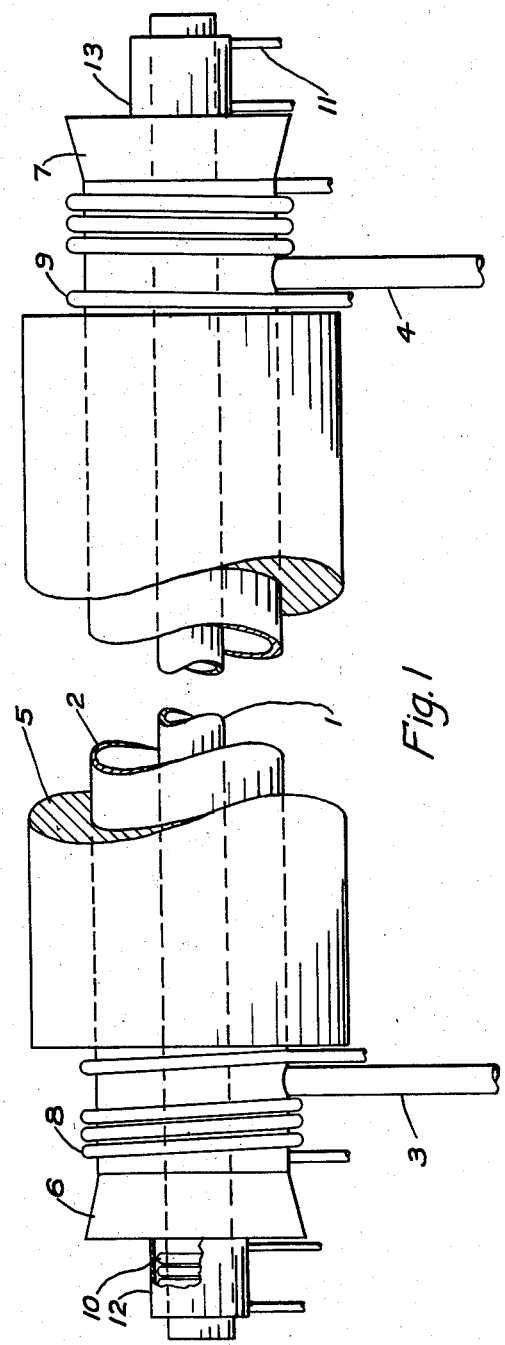
Fig. 1
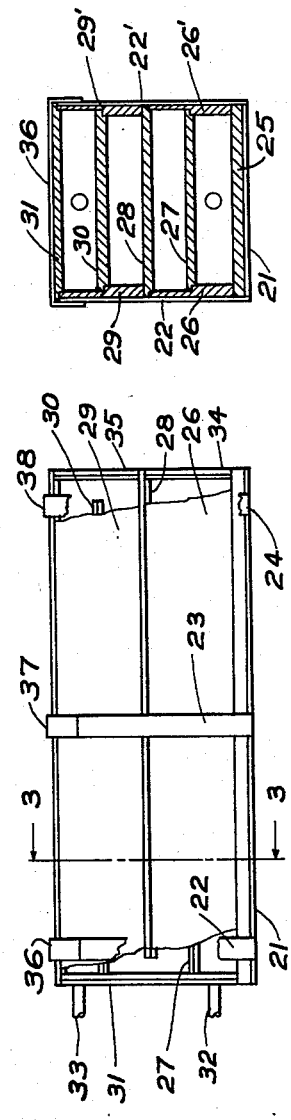
Fig. 3
Fig. 2
Inventor
William S. Calcott
By Robert A. Lavender
Attorney Oct. 13, 1959 W. S. CALCOTT 2,908,548
MANUFACTURE OF UF₄

Filed April 13, 1945 2 Sheets-Sheet 2

Inventor
William S. Calcott

By Robert A. [signature]
Attorney

United States Patent Office 2,908,548
Patented Oct. 13, 1959

2,908,548

MANUFACTURE OF UF$_4$

William S. Calcott, Woodstown, N.J., assignor to the United States of America as represented by the United States Atomic Energy Commission Application April 13, 1945, Serial No. 588,213

1 Claim. (Cl. 23—14.5)

This invention relates to reactions involving gaseous hydrogen fluoride as a reactant and particularly relates to the manufacture of uranium tetrafluoride.

It is known that uranium tetrafluoride may be prepared by the action of anhydrous hydrogen fluoride upon uranium dioxide at elevated temperatures. The most advantageous temperatures for conducting the reaction lie between 400° C. and 600° C., and for producing a product free from traces of unreacted uranium dioxide temperatures of 500° C. to 650° C. are desirable, at least toward the end of the reaction period.

Ordinary materials of construction suffer severely from corrosion by hydrogen fluoride at these high temperatures. Iron and steel have a very short life. Metals such as nickel and copper disintegrate rapidly also. Moreover the disintegration of the apparatus during reaction results in substantial contamination of the uranium tetrafluoride by metal fluorides of the metal used for constructing the apparatus. Thus, substantial quantities of nickel, iron and copper may be found in the product.

It is an object of the present invention to convert uranium dioxide to uranium tetrafluoride in an environment conducive to the production of material substantially free from contaminating metallic impurities. It is a further object to provide an apparatus for carrying out the process which possesses a relatively long life compared to apparatuses previously employed for this purpose. Further objects will be apparent from the following general description and detailed illustrations of the invention.

In accordance with the invention, the material to be reacted with hydrogen fluoride is brought into intimate contact with anhydrous hydrogen fluoride gas at reaction temperatures in an apparatus having the surfaces exposed to the reactants composed of carbon.

Preferably graphite or a substantially imprevious carbon such as the phenolic-resin-impregnated carbon known as "Karbate" is employed. The apparatus may be constructed in the form of a reaction tube of such a material or it may be built up from blocks or slabs of this material. Instead of employing carbon to provide the structural strength required for containing the reactants, it is possible to employ a reactor composed of a metal, such as steel, nickel, Monel, and the like, coated with a carbon coating. Ordinary stove polish has been applied to such metallic containers to provide a satisfactory apparatus. An especially suitable coating material is the colloidal dispersion of graphite in water marketed as "Aquadag." When apparatus constructed of metals is entirely coated with this material, a uranium tetrafluoride product can be obtained having a surprisingly low proportion of contaminating metallic impurities.

In the accompanying drawing

Figure 5:
Figure 6:
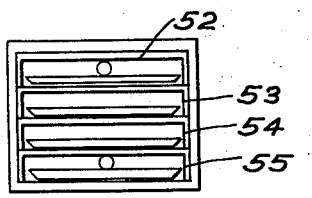

Figure 1 shows a form of apparatus comprising a "Karbate" reaction tube, which has been used successfully in applying the present invention, Figure 2 is a longitudinal elevation showing a reactor built up from graphite slabs or blocks, Figure 3 is a section on line 3—3 of Figure 2, Figure 4 is a plan view of the apparatus of Figures 2 and 3 with the top removed, Figure 5 is a longitudinal elevation showing schematically a Monel apparatus which has been employed for the production of uranium tetrafluoride both with and without carbon coatings to prevent contact of reactants with the metal, and Figure 6 is a sectional view showing schematically the apparatus of Figure 5 with protective canopies in place.

With especial reference to Figure 1, the numeral 1 designates a Karbate tube about 5 feet long and having an inside diameter of 1⅜ inches and an outside diameter of 2 inches. The tube 1 is supported within a steel jacket 2 having an inlet 3 and outlet 4 for passage of a temperature-controlling gas, e.g., nitrogen, through the jacket. This gas also serves as a diluent and carrier to remove any gases or vapors permeating the walls of the carbon tube. The jacket 2 is covered with heat insulation 5. The ends of the jacket are sealed by stoppers 6 and 7 and the seals are wound with copper cooling coils 8 and 9. The ends of the tube, which extend beyond the stoppers 6 and 7, are wound with copper cooling coils 10 and 11 and are provided with electrical connections 12 and 13 for applying an electrical current to the carbon tube. By using the carbon tube as a resistor in this manner sufficient heat is generated to provide the necessary reaction temperatures.

With reference to Figures 2, 3, and 4 a metal plate 21 forms a base for the reactor box. The base 21 carries three pairs of arms 22, 22', 23, 23', 24 and 24' welded to the edges of the base 21 in vertical positions so as to form a cage for the reactor.

The reactor itself comprises floor member 25 which supports a pair of upright boards 26 and 26' forming the side walls for the lower half of the reactor. These boards are cut away to provide ledges upon which a shelf 27 rests. Spanning the tops of members 26 and 26' is a second shelf 28 and upon this shelf is a second pair of side walls 29 and 29' similar to members 26 and 26'. Shelf 30 rests on the ledges midway between the bottom and top of side members 29 and 29' and a top 31 spans the tops of these side members. The sides of each of the shelves 27, 28 and 30 and the top 31 are chamfered to mate with the supporting edges of members 26, 26', 29, and 29'. Although this construction is not essential, it provides a better seal and a more satisfactory joint for the application of a carbon cement than obtainable by using a plain square edge. One end of the reactor is closed by end member 31 having inlet 32 and outlet 33 and the other end of the reactor is closed by a lower end member 34 and an upper member 35. As shown in Figure 2 each of shelves 27 and 30 has one end flush with the end member 31 and the other end stopping short of end members 34 and 35 respectively. This construction provides a sinuous channel back and forth from the inlet 32 to the outlet 33 so that gases passing from the inlet to the outlet make four passes the length of the reactor. As shown more clearly in Figure 4 the side walls and ends are chamfered to provide a firm support for the end members. All of the structural members 25 to 35 are composed of graphite.

Metal clamps 36, 37, and 38 fit over the upper ends of arms 22 and 22', 23 and 23', and 24 and 24' so as to prevent separation of the ends of the arms and consequent collapse of the assembly. The entire assembly is adapted for insertion in an oven heated in any suitable manner to provide suitable reaction temperatures.

In using this apparatus the uranium dioxide to be reacted is loaded onto the floor 25 and shelves 27, 28, and 30 and joints are sealed by a carbon cement, such as Carbo-korez, in the process of assembling the apparatus.

The apparatus, after assembly is complete, is placed in a heated oven and inlet 32 and outlet 33 are connected to the appropriate gas lines. After completion of the reaction the assembly is removed from the oven and progressively disassembled to recover the reaction product from the floor and shelves of the reactor.

With particular reference to Figures 5 and 6, the apparatus illustrated in these figures comprises a Monel reaction chamber 41 having gas inlet 42 and gas outlet 43. The reaction chamber contains a series of shelves 44, 45 and 46 adapted to support pans 47 for containing the material to be reacted. Shelves 44 and 46 are spaced from the end of the reactor remote from the inlet and outlet and shelf 45 is spaced from the opposite end so as to provide a sinuous gas passage through the reactor. The end of the reaction chamber remote from the gas connections is flanged to provide a mounting for the end piece 48 which is removably mounted by bolts 49 so that the pans 47 can be removed from the apparatus. The end member 48 comprises a packed gland 50 forming a seal between this end of the reactor and shelf 45. The Monel metal is protected from furnace gases by a steel shell 51 which encases the reactor.

In order to protect the contents of pans 47 from metallic dust, canopies 52, 53, 54, and 55 may be provided for the three shelves and floor of the reactor. These canopies are open at the ends so as not to interfere with the flow of gas through the apparatus. They are preferably constructed of Monel coated on both sides with a carbon paint such as Aquadag or stove polish. A copper gasket 56 is provided to prevent leakage of gas at the union of the end member 48 with the reactor body 41. In using this apparatus it may be removably installed in the same manner as the apparatus of Figures 2, 3, and 4, or it may be permanently installed in a suitably heated furnace providing access to the removable end piece 48. The charge is loaded and unloaded merely by inserting and withdrawing the pans.

The apparatus of Figure 5 may be used for the production of a product low in metal content with or without the canopies shown in Figure 6. In general, it is sufficient to coat the inside of pans 47 with a carbon paint such as Aquadag or stove polish. However the canopies provide a ready means of protecting the charge from contamination after the apparatus has become corroded to such an extent that there is a possibility of substantial contamination by metallic impurities dropping from the undersides of reactor shelves into the pans directly beneath.

The following examples further illustrate the invention.

*Example 1*

Into the center one-third of the carbon tube of the apparatus illustrated in Figure 1, 470 grams of uranium oxide was placed and uniformly distributed to provide a passage for reaction gas above the solid material. The tube was heated to 500° C. by passing an alternating current of 9 to 10 amperes through the carbon. Hydrogen fluoride of 99% purity (containing less than 0.1% $H_2O$) was passed into the tube at normal pressure at an average rate of 40 to 50 grams per hour until the gases contained less than 0.3% water as determined by a conductivity measurement. This operation required about 10½ hours. During this period the temperature was held between 500° and 540° C. A uranium tetrafluoride product substantially free from metallic impurities and completely soluble in sulfuric acid was thus obtained.

*Example 2*

The process of Example 1 was repeated employing a reaction temperature of 425° to 450° C. and a time of 13½ hours. The average current was 8.1 amperes. The uranium tetrafluoride product obtained was substantially free from metallic impurities but contained traces of insoluble material indicating that the reaction was not quite complete.

*Example 3*

Into an apparatus of the type illustrated in Figures 2, 3 and 4 300 pounds of uranium dioxide was charged, 75 pounds onto each of the four trays. The charge was distributed over the area of the trays by means of a rake so that each tray was coated uniformly except for about 2 inches at the outlet end, about 1 inch on each side and about 6 inches at the inlet end. After loading, the surface of the solid material was furrowed by means of a wooden mold so as to increase the surface area exposed to gases.

The graphite box was assembled; cracks were stopped by plugging with a carbon cement (Carbo-korez). The loaded reactor was placed in the oven and the headers were connected for inlet and exhaust gases. The temperature was then raised by means of the furnace to about 500° C., all connections were tightened, and the temperature was raised further to about 560° C. Nitrogen was passed through the box for five minutes while the temperature was maintained at about 560° C. Anhydrous hydrogen fluoride was then fed through the inlet header for one hour at approximately ½ pound pressure while the temperature was allowed to fall to about 540° C. After the first hour the flow of anhydrous hydrogen fluoride was increased to about 13 pounds per hour while the temperature was maintained at 500° C. to 530° C. After 10 to 15 hours, the temperature was raised to about 575° C. the flow of anhydrous hydrogen fluoride was stopped, and hydrogen was passed through the box for ½ hour at a rate of 100 cu. ft. per hour, measured at standard temperature and pressure.

The hydrogen flow was then stopped and anhydrous hydrogen fluoride flow was resumed at a flow rate of about 13 pounds per hour for an additional 8 hours. The flow of hydrogen fluoride was then stopped and nitrogen was passed through the reactor for about 10 minutes to expel unreacted hydrogen fluoride and water vapor. The reactor was then allowed to cool to room temperature. Cooling was expedited by removing the unit from the furnace and allowing it to cool in a gas-cooled chamber. The reactor was then opened and the charge of reaction product was removed by raking and scooping it from the carbon trays. A product containing less than 0.002% iron, less than 0.0004% nickel, and less than 0.0001% copper was readily obtainable in this manner.

*Example 4*

A Monel apparatus of the type illustrated in Figures 5 and 6 of the drawing was coated with Aquadag by applying the colloidal suspension with a paint brush and drying at 110° C. The shelves were coated both on the top and bottom and pans 47 were coated on the inside. The pans were then charged with uranium dioxide and the oxide was converted to the tetrafluoride in the manner described in Example 3. The product was found to contain 5 parts of nickel per million and 6 parts of copper per million. In other similar tests products containing from 0 to 12 parts of nickel and from less than one up to 6 parts of copper per million parts of solids were obtained.

Using canopies 52, 53, etc. coated with Aquadag and pans 47 similarly coated, a product having a purity within this same range was obtained.

Employing ordinary stove polish in place of Aquadag, products averaging about 1.3 parts of nickel and less than one part of copper per million parts of solid were obtained.

When the same apparatus was employed without coating the pans but using otherwise similar reaction conditions, the products averaged about 36 parts of nickel and 20 parts of copper per million parts of solids.

It will be understood that I intend to include variations and modifications of the invention and that the preceding examples are illustrations only and in no wise to be construed as limitations upon the invention, the score of which is defined in the appended claim, wherein I claim:

A process of making very pure $UF_4$ from $UO_2$ which comprises placing $UO_2$ in a reactor the inner surfaces of which consist of free unimpregnated carbon, raising and maintaining the temperature of the reactor in the range from 500° C. to 600° C., passing nitrogen through the reactor to flush out the air, then passing anyhdrous HF through the reactor in contact with the $UO_2$ for several hours, stopping the flow of HF and passing hydrogen through the reactor for less than an hour, then resuming the flow of HF through the reactor for several hours, stopping the flow of HF and passing nitrogen through the reactor for a few minutes to expel unreacted HF and water vapor, cooling the reactor to room temperature and removing the $UF_4$ that has been made therein.

References Cited in the file of this patent

UNITED STATES PATENTS

| | | |
|---|---|---|
| 50,907 | Coles | Nov. 14, 1865 |
| 97,168 | Clark | Nov. 23, 1869 |
| 141,379 | Plumer | July 29, 1873 |
| 393,079 | Rumpf | Nov. 20, 1888 |
| 538,025 | Long | Apr. 23, 1895 |
| 1,050,902 | Acker | Jan. 21, 1913 |
| 1,367,993 | Stahl | Feb. 8, 1921 |
| 1,434,485 | D'Adrian | Nov. 7, 1922 |
| 1,826,806 | Marden et al. | Oct. 13, 1931 |
| 1,892,652 | Heath | Dec. 27, 1932 |
| 1,983,598 | Chaney | Dec. 11, 1934 |
| 2,088,048 | Bishop | July 27, 1937 |

OTHER REFERENCES

Friend: "Textbook of Inorganic Chemistry," vol. 7, Pt. 3, page 291 (1926). Publ. by Charles Griffin & Co., Ltd., London.

Mellor: "Comprehensive Treatise on Inorganic and Theoretical Chemistry," vol. 12, 1932, pages 73, 74.

Chem. Ind., May 1944, "Recent Developments in Carbon Chemical Equipment," pp. 683–4, by Ollinger.